United States Patent [19]
Chubarov et al.

[11] 4,317,981
[45] Mar. 2, 1982

[54] METHOD AND APPARATUS FOR CONTROLLING A MOVABLE ENERGY SOURCE WHEN IT IS OPERATED TO HEAT THE SURFACE OF AN OBJECT

[76] Inventors: Evgeny P. Chubarov, 1 Mikroraion, korpus 12, kv. 141, Moscow, Teply Stan; Viktor A. Kubyshkin, ulitsa Tsiolkovskogo, 2, kv. 56, Schelkovo-3, Moskovskaya oblast; Vladimir E. Mitrofanov, ulitsa Lenskaya-Timiryazeva, 12, kv. 45., Pavlovo-Posad, Moskovskaya oblast; Alexandr N. Emelyanov, ulitsa Shnyreva, 37, kv. 16, Istra, Moskovskaya oblast; Anatoly G. Butkovsky, ulitsa Butlerova, 2, korpus 2, kv. 8; Kemer B. Norkin, ulitsa Volgina, 23, korpus 1, kv. 109, both of Moscow; Anatoly G. Aizenshtein, ulitsa Bosova, 18, kv.12, Istra, Moskovskaya oblast; Margarita B. Kolomeitseva, ulitsa Baikalskaya, 30, korpus 2, kv. 49, Moscow; Arthur M. Suvorov, ulitsa Marxistskaya, 9, kv. 227, Moscow; Sergei A. Vazhnov, ulitsa M.Kaluzhskaya, 12, kv. 57, Moscow, all of U.S.S.R.

[21] Appl. No.: 955,022

[22] Filed: Oct. 25, 1978

[30] Foreign Application Priority Data

Oct. 31, 1977 [SU] U.S.S.R. .............................. 2542762

[51] Int. Cl.³ .............................................. B23K 15/00
[52] U.S. Cl. ..................... 219/121 EA; 219/121 EW; 219/121 LA; 219/121 LX
[58] Field of Search ................ 219/121 EA, 121 EW, 219/121 LB, 121 LX, 124.34, 121 EB, 121 EM

[56] References Cited

U.S. PATENT DOCUMENTS

| | | | |
|---|---|---|---|
| 3,004,166 | 10/1961 | Greene | 219/121 EW X |
| 3,502,882 | 3/1970 | Von Voros | 219/124.34 X |
| 3,576,420 | 4/1971 | Iceland et al. | 219/121 EA X |
| 3,699,334 | 10/1972 | Cohen et al. | 219/121 EA X |
| 3,775,581 | 11/1973 | Sciaky | 219/121 EA X |

FOREIGN PATENT DOCUMENTS

| | | | |
|---|---|---|---|
| 418836 | 3/1974 | U.S.S.R. | |
| 482029 | 10/1975 | U.S.S.R. | 219/121 EW |
| 560370 | 7/1977 | U.S.S.R. | 219/121 EW |

OTHER PUBLICATIONS

*Automation and Remote Control*, vol. 23, No. 10 Oct. 1962, Translation Published Jun. 1963; "Automatic Adjustment of a Universal Function Generator with a Piecewise-Linear Approximation" by K. B. Norkin.
*Energy*; Leningrad 1975, p. 39–41, "Multichannel Analog to Digital Converters" by E. I. Shuskov and M. B. Tzodikov.
Kogan; *Electronic Modeling Devices and their Use in Investigation of Automatic Control Systems*, 2nd Edition, Moscow 1963; pp. 191-194.

*Primary Examiner*—Gene Z. Rubinson
*Assistant Examiner*—Keith E. George
*Attorney, Agent, or Firm*—McAulay, Fields, Fisher, Goldstein & Nissen

[57] ABSTRACT

A method of controlling a movable energy source includes controlling the velocity and the power of the energy source moved along the predetermined path in accordance with a difference between the predetermined and the measured temperature at different areas of the surface. A signal to control the movement of the energy source is provided when the path of the source is approximated by a broken line represented by the piecewise linear function or arcs of circles of different radii. The power of the source is varied in proportion to the average deviation of the measured temperature from the predetermined one for each area of the surface. The velocity of the source is controlled using the signals representative of the difference between the predetermined and the measured temperature. An apparatus for carrying out this method includes a temperature sensor, a signal forming unit adapted to form the signals representative of the correction values of the velocity of the source, and a functional signal converter adapted to convert the latter signals to the signals representative of the components determined by the law of movement of the source.

11 Claims, 10 Drawing Figures

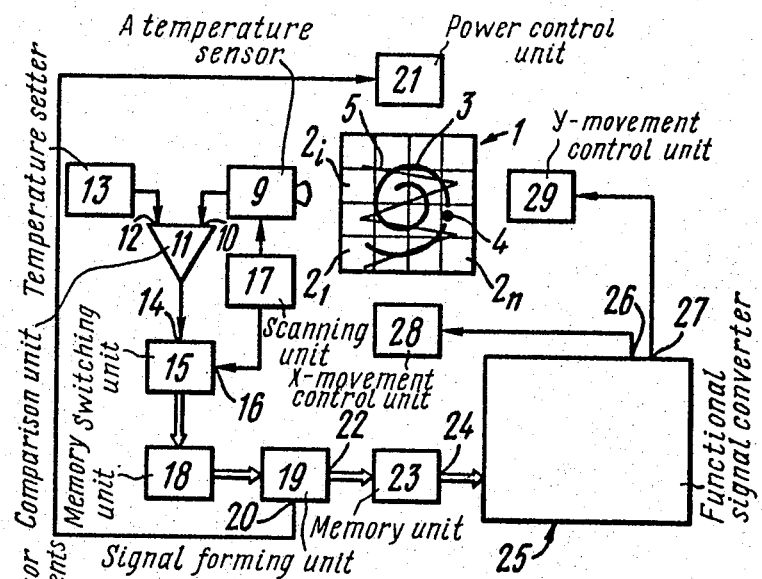
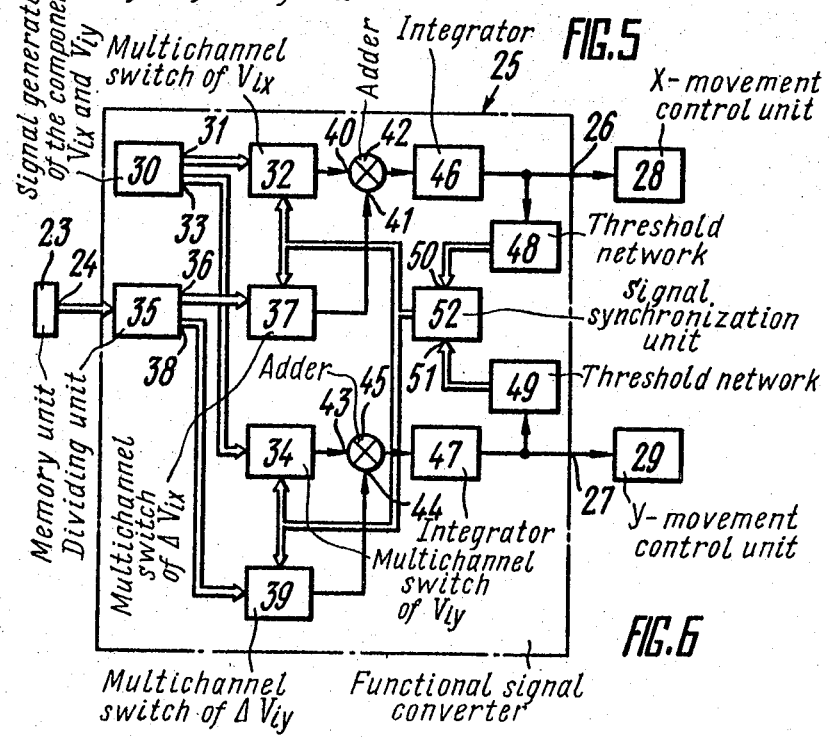

METHOD AND APPARATUS FOR CONTROLLING A MOVABLE ENERGY SOURCE WHEN IT IS OPERATED TO HEAT THE SURFACE OF AN OBJECT

BACKGROUND OF THE INVENTION

1. Field of the Invention

The invention relates to systems that automatically control the temperature of an object being heated, and more particularly to a method and apparatus for controlling a movable energy source when it is being operated to heat the surface of an object.

The invention is applicable to controlling a spatial movement of localized energy sources such as electron, ion, laser or plasma beams and electric arc as well. The invention can find use in metallurgy for melting, ingot pulling and zone-type cleaning; in mechanical and instrument engineering; in welding, mechanical treatment and heat treatment; in microelectronics; in vacuum film deposition methods and apparatus, in microtreatment and the like.

2. Description of the Prior Art

Known in the art is a method for controlling electron beam heating, wherein an electron beam is caused to be rotated along the circumference of a circle of a given radius that is adjusted by varying the amplitude of sine sweep voltages and the velocity of movement of the electron beam is adjusted by varying the oscillation frequency of a sine voltage. An apparatus to realize the described method comprises two phase shifters, an adder, three amplifiers, and a double amplitude limiters. The sine voltages that are 90° out of phase with respect to each other are applied, via matching amplifiers, to the deflection system of an electron gun.

Known in the art is another method for controlling electron beam heating, wherein an electron beam is caused to pass over the predetermined locations on an object and is held immovable for a certain time interval at each such location. An apparatus for carrying out this method comprises two locked-on generators providing step voltages and coupled to the deflection systems of an electron gun.

Known in the art is a method and apparatus for automatic control of the heating mode of an electronic thermal installation. In accordance with the method, the power of the electron beam is adjusted by varying the power delivered to the cathode of the electron gun with the help of a Hall sensor that reads the beam power. The apparatus comprises a Hall sensor, a comparison unit and a regulator that controls the power fed to the cathode of the electron gun.

The above-mentioned methods and apparatus are disadvantageous in that they do not provide for a correction of the movement and power of the energy source, which is necessary to compensate for a deviation in the distribution of the temperature measured on the surface of an object from a preset distribution.

There is a method for controlling electron beam heating, which method is realized by virtue of an apparatus providing for controlling the electron beam heating mode of a furnace (cf. the USSR Inventor's Certificate No. 418,836 dated Aug. 2, 1972).

The known method comprises the steps as follows: measuring the temperature of the surface of an object by means of a scanning pyrometer that receives pertinent data in passing along the predetermined path on the object surface; obtaining a signal representative of a difference between the measured and the preset temperature of the object surface and remembering that signal; varying the power and movement of the energy source along the predetermined path in accordance with the signal representative of the temperature difference.

An apparatus to realize the above-described method comprises a temperature pickup to sense the temperature on the surface of an object and a scanning unit which constitute together a scanning pyrometer with a deflection system, a temperature setter adapted to set a temperature to which the object is heated, a comparison unit adapted to compare the predetermined and the measured temperature, control units adapted to control the movement of the energy source relative to rectangular axes, and memory units to store the signals representative of the predetermined and measured temperature.

In the described method and apparatus, the same path is used along which the energy source (electron beam) is moved and along which the temperature on the surface of the object is measured. Note that the same signal provides for the displacement of the energy source and for the scanning movement of the pyrometer, that signal being formed on the basis of the signal representative of the difference between the predetermined and measured temperature. As a result, the temperature pickup for sensing the temperature on the object surface can be implemented only as a camera tube with electronic scanning. This in turn imposes limitations on the described method and apparatus since the present-day temperature sensors with optical/mechanical scanning feature higher accuracy.

In addition, the most useful applications of the described method and apparatus are concerned with the case where the movement of the energy source and, therefore, the path along which the temperature is measured are one-dimensional; on the other hand, sufficient difficulties arise when the energy source is caused to move along an arbitrary path on the object surface. Finally, it is not possible to utilize the described method and apparatus in the case where the path along which the energy source is moved and that along which the temperature is measured do not coincide with each other or in the case where the temperature is to be measured concurrently at several points on the object.

SUMMARY OF THE INVENTION

An object of the invention is to provide for the movement of an energy source along an arbitrary path on the surface of an object and for the correction of the velocity and power of the energy source in the course of its movement along this path, effected in response to the signals from a temperature sensor that checks on the distribution of temperature at arbitrary points on the surface of the object.

In accordance with one feature of the invention, a method of controlling an energy source moved along a predetermined path on a heating surface of an object with a predetermined velocity comprises the steps as follows: dividing the heating surface of the object into n elementary areas; providing and remembering error signals representative of a difference between the predetermined and measured temperature of the heating surface of the object and assigned to respective elementary areas of the heating surface of the object; utilizing the error signals for producing the signals representative of the correction values for the velocity and the power of the movable energy source as related to the elementary areas that include corresponding segments of the predetermined path; and functionally converting the signals representative of the correction values for the velocity of the movable energy source to the signals representative of the components, determined by the law of movement of the energy source and related to rectangular axes, and responsible for a variation of the velocity of the energy source being moved along the predetermined path so that the difference between the predetermined the measured temperature, related to each of the elementary areas, is decreased.

A preferred method comprises the following steps by which the signals representative of the correction values for the velocity of the energy source are converted to the signals representative of the components determined by the law of movement of the energy source and related to the rectangular axes: approximating the predetermined path using straight line segments and determining the projections of each of the segments on the rectangular axes; providing the signals representative of the components of the velocity of the energy source, related to the rectangular axes, and proportional to the values of the projections of the straight line segments of the predetermined path; dividing the signal representative of the correction value for the velocity of the energy source for each of the segments of the path into two signals representative respectively of the correction values of the components of the velocity of the energy source, related to corresponding rectangular axes, and each proportional to the value of the projection of a given straight line segment of the path on a respective rectangular axis; adding each of the signals representative of the correction values of the components of the velocity of the energy source related to corresponding rectangular axes to a respective signal representative of one of the components of the velocity, related to a respective rectangular axis; and integrating the summation signals so produced to obtain the signals representative of the components determined by the law of movement of the energy source and related to the rectangular axes.

Another preferred method comprises the following steps by which the signals representative of the correction values of the velocity of the energy source are converted to the signals representative of the components determined by the law of movement of the energy source and related to the rectangular axes: approximating the predetermined path of the energy source using circle arcs and determining the value of the curvature of each of the circle arcs; providing control signals by summing the signals representative of the predetermined velocity of the energy source and the signals representative of the correction values of the velocity; switching the control signals to provide the signal representative of the velocity of the energy source; integrating the signal representative of the velocity of the energy source to provide a signal representative of the distance passed by the energy source along the predetermined path; forming a signal which is representative of the form of the path of the energy source and which is proportional to the obtained values of the curvature of the circle arcs of the path, multiplying the latter signal by the signal representative of the velocity of the energy source and integrating the signal so obtained to provide a resulting signal; simultaneously integrating the sine and cosine values of the resulting signal and providing the signals representative of the components determined by the law of movement of the energy source and related to the rectangular axes.

A preferred method comprises the following steps in the case where the energy source performs a periodical or an approximately periodical movement: generating, from the error signals, an average signal representative of an average value of the error signals and varying the power of the energy source in accordance with that average signal; and generating, from the signals representative of the differences between each of the error signals and the average signal, the signals representative of the correction value for the velocity of the energy source.

In accordance with another feature of the invention, an apparatus for carrying out the method of the invention comprises two units adapted to control the movement of the energy source along the rectangular axes, a unit adapted to control the power of the energy source, a temperature setter adapted to set the temperature of the heating surface of the object, a comparison unit adapted to compare the predetermined and the measured temperature of the heating surface of the object, the comparison unit having a first input coupled to the output of a temperature sensor adapted to sense the temperature of the heating surface of the object, having a second input coupled to the temperature setter, and having its output coupled to a data input of a switching unit adapted to switch over the error signals representative of the difference between the predetermined and the measured temperature and having its control input coupled to a scanning unit, the output of the switching unit being coupled to a memory unit adapted to store the error signals and having its output coupled to a signal forming unit adapted to form the signals representative of the correction values of the velocity and the power of the energy source, the correction value signal forming unit having a first output coupled to a memory unit adapted to store the signals representative of the correction values of the velocity of the energy source, and having a second output coupled to the power control unit, the velocity correction value memory unit having its outputs coupled to the inputs of a functional signal converter adapted to convert the signals representative of the correction values of the velocity to the signals representative of the components determined by the law of movement of the energy source and related to the rectangular axes.

In a preferred apparatus, the functional signal converter comprises a signal generator adapted to generate the signals representative of the two components of the velocity of the energy source; a signal dividing unit adapted to divide the signal representative of the correction value of the velocity of the energy source into two signals which are representative respectively of the correction values of corresponding components of the velocity, related to respective rectangular axes, the input of the signal dividing unit being used as a respective input of the functional signal converter and coupled to a respective output of the velocity correction value memory unit; a multichannel switch adapted to switch the signal representative of one component of the velocity of the energy source related to one rectangular axis and a multichannel switch adapted to switch the other component of the velocity of the energy source related to the other rectangular axis, the two multichannel switches having their data inputs coupled to those outputs of the signal generator which correspond to the components of the velocity of the energy source related to the rectangular axes; a multichannel switch adapted to switch the signal representative of the correction value of one component of the velocity related to one rectangular axis and a multichannel switch adapted to switch the signal representative of the correction value of the other component of the velocity related to the other rectangular axis, the inputs of the two multichannel switches being coupled to respective inputs of the signal dividing unit; a first adder having a first input coupled to the output of the one component signal multichannel switch, and having a second input coupled to the one component correction value signal multichannel switch; a second adder having a first input coupled to the other component signal multichannel switch, and having a second input coupled to the other component correction value signal multichannel switch; first and second integrators having their inputs coupled respectively to the first and second adders and having outputs coupled to respective movement control units; first and second threshold networks having their inputs coupled respectively to the outputs of the first and second integrators; a signal synchronization unit adapted to synchronize the signals representative of the components of the velocity and the signals representative of the correction values of the components of the velocity related to respective rectangular axes, the signal synchronization unit having its inputs coupled to the outputs of the first and second threshold networks and having its output coupled to the control inputs of all of the multichannel switches.

In another preferred apparatus, the functional signal converter comprises a velocity setter adapted to set the velocity of the energy source, an adder unit having a first input group coupled to the velocity setter, and having a second input group used as a respective input of the functional signal converter and coupled to the velocity correction value memory unit, a switch unit adapted to switch the control signals and having its data inputs coupled to the outputs of the adder unit, a first integrator having a data input coupled to the output of the control signal switch unit, having a control input coupled to the output of a threshold network, and having its output coupled to the input of the threshold network and to the input of a conversion unit adapted to convert the signal representative of the distance passed by the energy source along the predetermined path to the signal representative of the form of the path, a first multiplication unit having a first input coupled to the output of the distance conversion unit, having a second input coupled to the control signal switch unit, and having its output coupled to the input of a second integrator, two channel networks adapted to form respectively the signals representative of the two components of the velocity of the energy source related respective rectangular axes, the two channel networks having respectively a cosine converter and a sine converter whose inputs are joined together and coupled to the second integrator, having respectively second and third multiplication units whose corresponding inputs are coupled to the cosine and sine converters and whose other inputs are coupled to the output of the control signal switch unit, and having respectively third and fourth integrators adapted to form in their respective channel networks the signals representative of the two components of the velocity of the energy source related to respective rectangular axes, the third and fourth integrators being coupled respectively to the second and third multiplication units and having their outputs coupled to the control inputs of the control signal switch unit.

In a preferred apparatus, there is a signal forming unit adapted to form the average signal and coupled to the error signal memory unit, and another signal forming unit adapted to the signal representative of the difference between of each of the error signals and the average signal, the second signal forming unit having an input coupled to the output of the first signal forming unit and to the input of the power control unit, having another input coupled to the error signal memory unit, and having its output coupled to the velocity correction value signal forming unit.

DESCRIPTION OF THE DRAWINGS

The invention will now be described by way of examples with reference to the accompanying drawings, in which:

FIG. 5 is a block diagram of an apparatus for controlling the movable energy source, according to the invention;

FIG. 6 is a block diagram of a functional signal converter used in the case where the path of the energy source is approximated using straight line segments, according to the invention;

DESCRIPTION OF THE INVENTION

Figure 1:
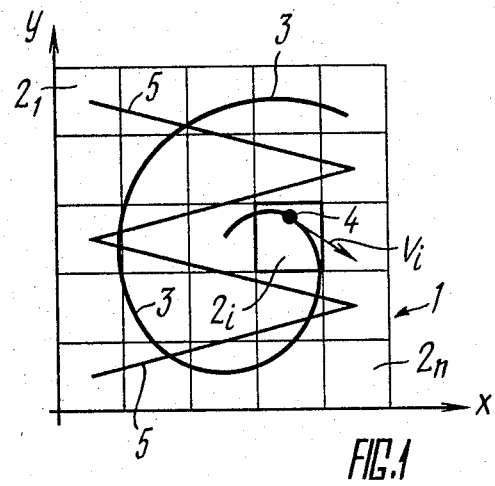
FIG. 1 is a diagrammatic representation of the heating surface of an object, bearing the path of a movable energy source, according to the invention.

A heating surface 1 (FIG. 1) of an object is divided into elementary areas $2_1, \ldots, 2_i, \ldots, 2_n$. An energy source 4 is moved along a predetermined path 3 at a velocity $V_1, \ldots, V_i, \ldots, V_n$ corresponding to the elementary areas $2_1, \ldots, 2_i, \ldots, 2_n$. The temperature of the heating surface 1 is measured along a scanning path 5.

To provide for control of the velocity $V_1, \ldots, V_i, \ldots, V_n$ during the heating of the heating surface 1 of the object, the path 3 (FIG. 2) is approximated by a broken line represented by a piecewise linear function. To this end, the path 3 represented by points $A_O, A_1, \ldots, A_m$ is divided into straight line segments 6. Curves 8,7 are employed to represent the components determined by the law of movement or manner by which the actual path of energy source 4 approximates the path 3 of the energy source 4 (FIG. 1) and related to rectangular axes X,Y as functions of time t. The vector $\overline{V}_i$ corresponds to the velocity of the energy source 4 (FIG. 1) at a segment 6 of the path 3 and $V_{ix}$ and $V_{iy}$ (FIG. 2) are the components of the velocity $V_i$ at the segment $6_i$ (FIG. 1), related to rectangular axes X,Y while $\Delta V_i$ corresponds to the correction value for the velocity $\Delta V_{ix}$ and $\Delta V_{iy}$ are the correction values for the components $V_{ix}$ and $V_{iy}$ for the velocity $V_i$ at the segment $6_i$, related to the axes X,Y.

Figure 3:
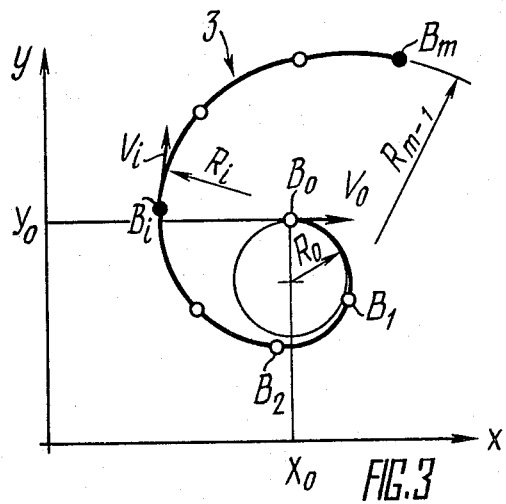
FIG. 3 is a graph showing how the signals $U_2$ are functionally converted in the case where the path of the energy source is approximated by the arcs of a circle, according to the invention.

According to another embodiment of the invention, it is possible to divide the path 3 (FIG. 3) into the segments separated by points $B_O, B_1, \ldots, B_m$, where m is the number of the segments approximated by the circle arcs having corresponding radii $R_O, \ldots, R_i, \ldots, R_{m-1}$, $X_O$ and $Y_O$ are the coordinates of the initial point $B_O$ of the path 3, $V_O$ is the vector of the tangent related to the path 3 at its initial point $B_O$, and $B_m$ is the final point of the path 3. The value of the curvature $\chi_i$ of the path 3 is inversely proportional to the radius $R_i$ of the arc of the approximating circle.

Figure 4:
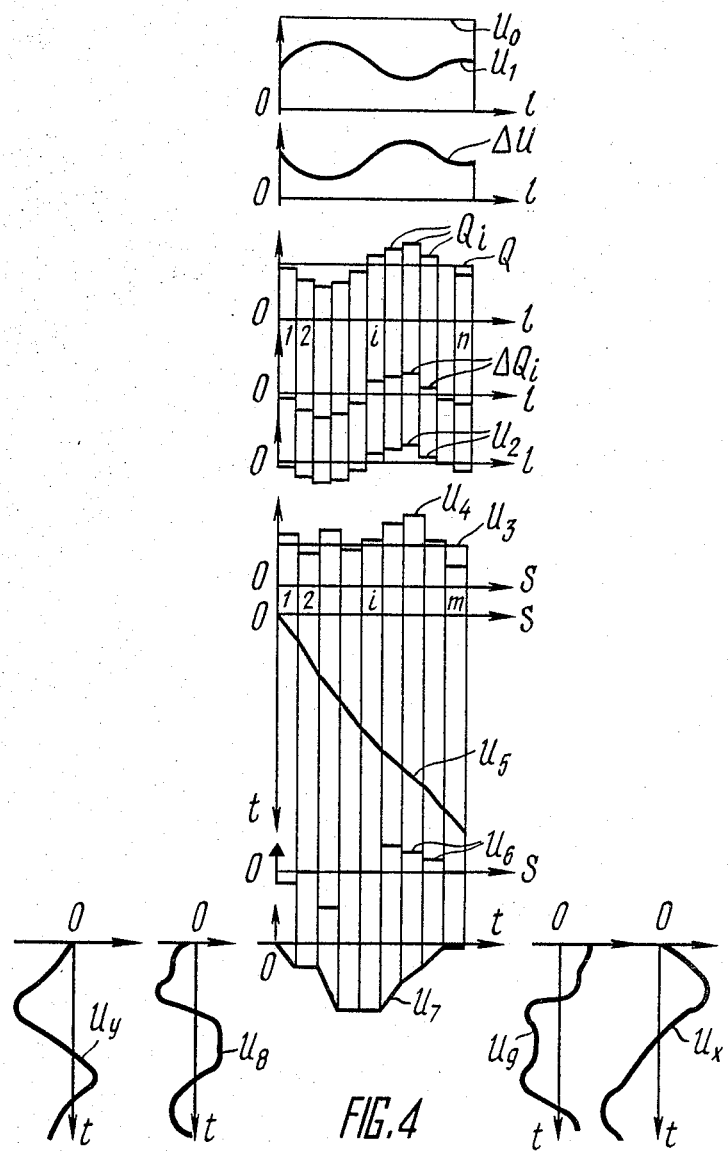
FIG. 4 is a graph showing the electrical signals used to vary the velocity and power of the energy source, according to the invention.

FIG. 4 shows the electrical signals used to vary the power and the velocity $V_i$ (FIG. 1) of the energy source 4:

$U_0$ is the signal representative of the predetermined temperature of the heating surface 1 (FIG. 1) of the object;

$U_1$ is the signal representative of the measured temperature of the heating surface 1 (FIG. 1) of the object;

$\Delta U$ is a continuous signal representative of a difference between the predetermined and the measured temperature of the heating surface 1 (FIG. 1) of the object;

$Q_i$ is the error signal representative of a difference between the predetermined and the measured temperature for each of n elementary areas;

Q is the average signal representative of the average value of the error signals $Q_i$;

$\Delta Q$ is the signal representative of a difference between the average signal Q and a given error signal $Q_i$;

$U_2$ is the signal representative of the correction value $\Delta V_i$ (FIG. 2) of the velocity $V_i$ for each of the elementary areas $2_1, \ldots, 2_i, \ldots, 2_n$;

$U_3$ is the signal representative of the velocity $V_i$ (FIG. 1) of the energy source 4;

$U_4$ is the control signal representative of the sum of the signals $U_2$ and $U_3$;

l is the length of the scanning path 5 (FIG. 1);

S is the distance passed by the energy source 4 (FIG. 1) on the heating surface 1 of the object, i.e., the length of the path 3;

$U_5$ is the signal representative of the distance S;

$U_6$ is the signal representative of the form of the path 3 (FIG. 1);

$U_7$ is the signal representative of the angle $\phi$ by which the vector of the velocity $V_i$ (FIG. 3) is rotated with respect to the vector of the tangent to the path 3 at its initial point $B_0$;

$U_x, U_y$ are the signals representative of the components 8,7 (FIG. 2) determined by the law of movement of the energy source 4 (FIG. 1);

$U_8$ is the signal representative of sin $\phi$;

$U_9$ is the signal representative of cos $\phi$.

Figure 2:
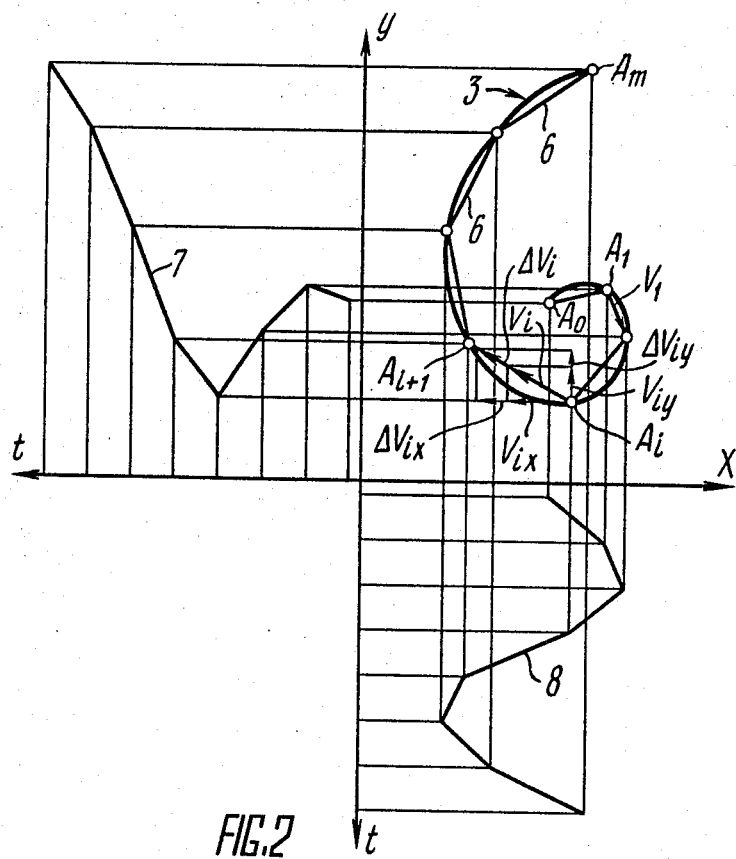
FIG. 2 is a graph showing how the signals $U_2$ are functionally converted in the case where the path of the energy source is approximated using straight line segments, according to the invention.

The apparatus of the invention for controlling the movable energy source 4 (FIG. 5) comprises a temperature sensor 9 that senses the temperature of the heating surface 1 of the object and is coupled to an input 10 of a comparison unit 11 adapted to compare the predetermined and the measured temperature of the heating surface 1, the comparison unit 11 having an input 12 coupled to a temperature setter 13 adapted to set the temperature of the heating surface 1 of the object. The output of the comparison unit 11 is coupled to a data input 14 of a switching unit 15 adapted to switch the error signals $Q_i$ (FIG. 4). A control input 16 (FIG. 5) of the switching unit 15 is coupled to a scanning unit 17 which is coupled optically with the temperature sensor 9. The outputs of the switching unit 15 are coupled to the inputs of a memory unit 18 adapted to store the error signals $Q_i$ for the n elementary areas (FIG. 4) and having its outputs coupled to the inputs of a signal forming unit 19 (FIG. 4) adapted to form the signals $U_2$ representative of the correction values $\Delta V_i$ (FIG. 2) for the velocity $V_i$ of the energy source 4 and signals representative of the correction values for the power of the energy source 4. An output 20 of the signal forming unit 19 is coupled to the input of a unit 21 adapted to control the power of the energy source 4, while outputs 22 of the unit 21 are coupled to a memory unit 23 adapted to store the velocity correction signals $U_2$ for the n elemental areas (FIG. 4). Outputs 24 (FIG. 5) of the memory unit 23 are coupled to the inputs of a functional signal converter 25 adapted to convert the signals $U_2$ to the signals $U_y, U_x$ (FIG. 4) representative of the components 7,8 (FIG. 2) determined by the law of movement of the energy source 4 (FIG. 1) and related to the rectangular axes Y,X. Outputs 26,27 (FIG. 5) of the functional signal converter 25 are coupled respectively to units 28,29 adapted to control the movement of the energy source 4 relative to the rectangular axes X,Y (FIG. 2).

In the case where the straight line segments 6 are used to approximate the predetermined path 3 (FIG. 2), the functional signal converter 25 (FIG. 6) employs the following circuitry. A signal generator 30 adapted to generate the signals representative of the components $V_{ix}, V_{iy}$ (FIG. 2) of the velocity $V_i$ of the velocity $V_i$ of the energy source 4 (FIG. 1) related to the rectangular axes X,Y has its output 31 (FIG. 6) coupled to a multichannel switch 32 adapted to switch the signal representative of the component $V_{ix}$ (FIG. 2) of the velocity $V_i$ of the energy source 4 (FIG. 1) related to the rectangular axis X. An output 33 (FIG. 6) of the signal generator 30 is coupled to a multichannel switch 34 adapted to switch the signal representative of the component $V_{iy}$ (FIG. 2) of the velocity $V_i$ of the energy source 4 related to the rectangular axis Y. There is a signal dividing unit 35 (FIG. 6) adapted to divide the signal $U_2$ (FIG. 4) representative of the correction value $\Delta V_i$ (FIG. 2) of the velocity $V_i$ of the energy source 4 (FIG. 1) into two signals which are representative respectively of the correction values $\Delta V_{ix}, \Delta V_{iy}$ (FIG. 2) of the components $V_{ix}, V_{iy}$ of the velocity $V_i$ related to corresponding axes X,Y. The signal dividing unit 35 has its input used as a respective input of the functional signal converter 25 (FIG. 6) and is coupled to an output 24 of the memory unit 23, and has an output 36 coupled to a multichannel switch 37 adapted to switch the signal representative of the correction value $\Delta V_{ix}$ (FIG. 2) of the component $V_{ix}$ of the velocity $V_i$ of the energy source 4 (FIG. 1) related to the rectangular axis X. An output 38 (FIG. 6) of the signal dividing unit 35 is coupled to a multichannel switch 39 adapted to switch the signal representative of the correction value $\Delta V_{iy}$ (FIG. 2) of the component $V_{iy}$ of the velocity $V_i$ of the energy source 4 (FIG. 1) related to the rectangular axis Y. The outputs of the multichannel switches 32,37 (FIG. 6) are coupled respectively to inputs 40,41 of an adder 42, while the outputs of the multichannel switches 34,39 are coupled respectively to inputs 43,44 of an adder 45. The outputs of the adders 42,45 are coupled respectively to the inputs of integrators 46,47 whose outputs are used as the outputs of the functional signal converter 25 and are coupled to the control units 28,29 and to threshold networks 48,49. The outputs of the threshold networks 48,49 are coupled to inputs 50,51 of a signal synchronization unit 52 adapted to synchronize the signals representative of the components $V_{ix}$, $V_{iy}$ (FIG. 2) of the velocity $V_i$ and the signals representative of the correction values $\Delta V_{ix}$ and $\Delta V_{iy}$ of the components $V_{ix}$, $V_{iy}$ of the velocity $V_i$ related to the rectangular axes X,Y. The output of the signal synchronization unit 52 (FIG. 6) is coupled to the control inputs of the multichannel switches 32,34,37,39.

Figure 7:
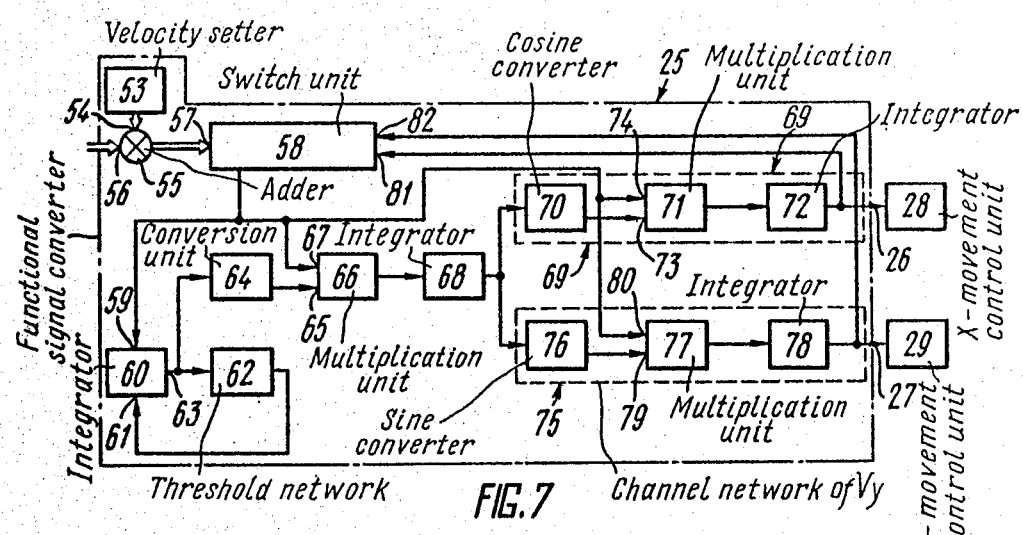
FIG. 7 is a block diagram of a functional signal converter used in the case where the path of the energy source is approximated using circle arcs, according to the invention.

In the case where the circle arcs are used to approximate the predetermined path 3 (FIG. 3), the functional signal converter 25 (FIG. 7) employs the following circuitry. A velocity setter 53 adapted to set the velocity $V_i$ (FIG. 2) of the energy source 4 (FIG. 1) is coupled to an input group 54 (FIG. 7) of an adder unit 55 which has its input group 56 used as respective inputs of the functional signal converter 25. The outputs of the adder unit 55 are coupled to data inputs 57 of a switch unit 58 adapted to switch the control signals $U_4$ (FIG. 4). The output of the switch unit 58 (FIG. 7) is coupled to a data input 59 of an integrator 60 having its control input 61 coupled to a threshold network 62 which has its input coupled to an output 63 of the integrator 60. A conversion unit 64, adapted to convert the signal $U_5$ (FIG. 4) representative of the distance S passed by the energy source 4 (FIG. 1) along the path 3 to the signal $U_6$ (FIG. 4) representative of the form of the path 3 (FIG. 1), is coupled to an input 63 (FIG. 7) of the integrator 60. The output of the conversion unit 64 is coupled to an input 65 of a multiplication unit 66 whose input 67 is coupled to the output of the switch unit 58 (FIG. 4) and whose output is coupled to the input of an integrator 68 (FIG. 7).

The functional signal converter 25 comprises a channel network 69 adapted to form the signal $U_x$ (FIG. 4) representative of the component 8 (FIG. 2) determined by the law of movement of the energy source 4 (FIG. 1) and related to the rectangular axis X. The channel network 69 (FIG. 7) comprises a serial arrangement including a cosine converter 70, a multiplication unit 71 and an integrator 72. The cosine converter 70 is coupled to an input 73 of the multiplication unit 71 that has its input 74 coupled to a respective output of the switch unit 58. The output of the integrator 72 serves as the output 26 of the functional signal converter 25 and is coupled to the control unit 28 that control the movement of the energy source 4 (FIG. 1) relative to the axis X.

A channel network 75 (FIG. 7) adapted from the signal $U_y$ (FIG. 4) representative of the component 7 (FIG. 2) determined by the law of movement of the energy source 4 (FIG. 1) and related to the axis Y comprises a serial arrangement including a sine converter 76, a multiplication unit 77 and an integrator 78. The sine converter 76 is coupled to an input 79 of the multiplication unit 77 that has its input 80 coupled to the switch unit 58. The inputs of the sine and cosine converters 76,70 (FIG. 7) are joined together and are coupled to the output of the integrator 68. The output of the channel network 75 serves as the output 27 of the functional signal converter 25 and is coupled to the control unit 29 that controls the movement of the energy source 4 (FIG. 1) relative to the axis Y. In addition, the outputs of the integrators 72,78 are coupled to control inputs 81,82 of the switch unit 58.

In the case where the energy source 4 (FIG. 8) moves over the heating surface 1 of the object according to periodic law, the apparatus of the invention comprises a signal forming unit 83 adapted to form the average signal Q (FIG. 4). The input of the signal forming unit 83 is coupled to the memory unit 18 (FIG. 8) adapted to store the error signals $Q_i$ (FIG. 4). The output of the signal forming unit 83 (FIG. 8) is coupled to the power control unit 21 and to an output 84 of a signal forming unit 85 adapted to form the signal $\Delta Q$ (FIG. 4) representative of the difference between a given error signal $Q_i$ and the average signal Q. The signal forming unit 85 (FIG. 8) has an input 86 coupled to the memory unit 18 and has its output coupled to the signal forming unit 19.

Figure 9:
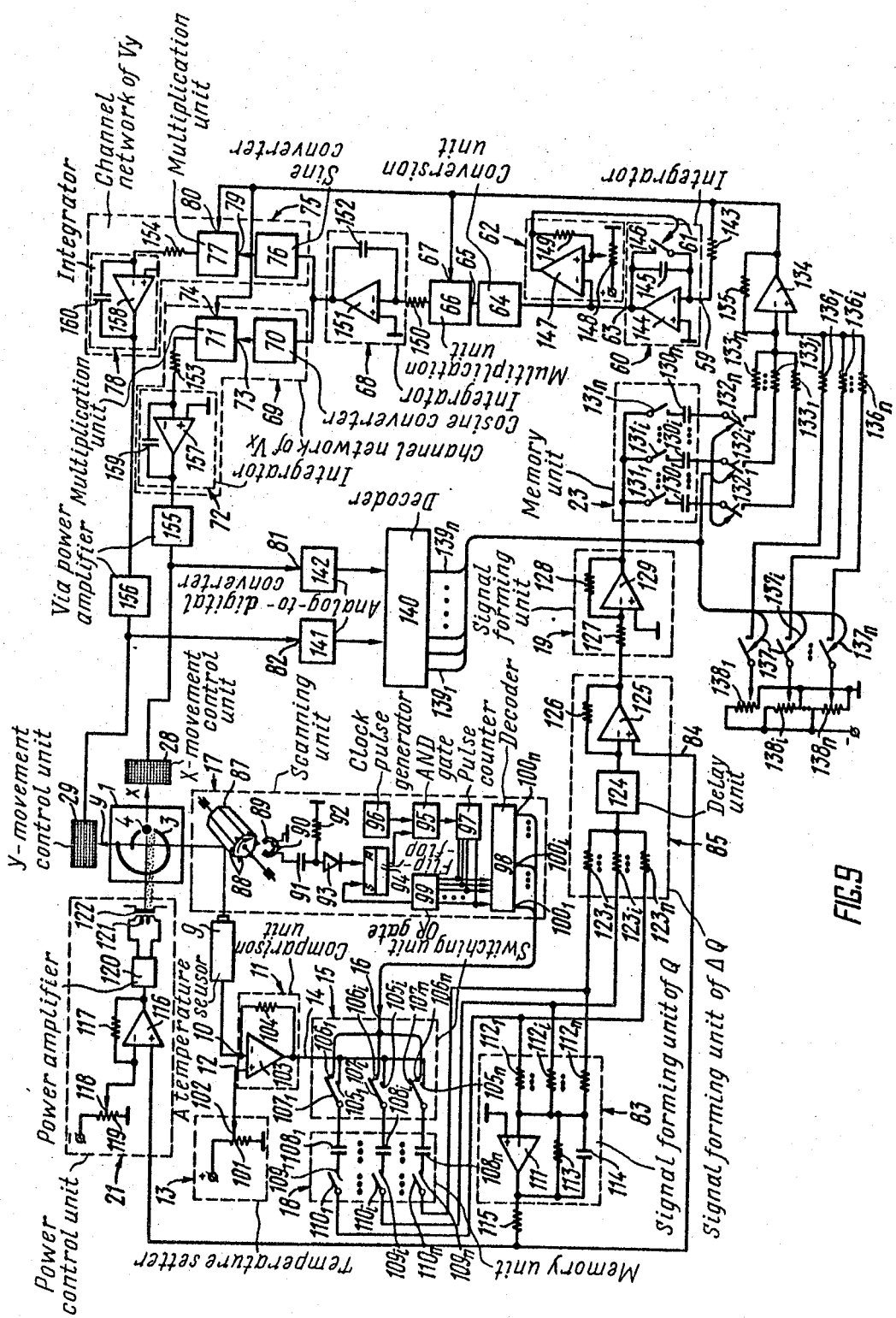
FIG. 9 is a circuit diagram of the apparatus for controlling the movable energy source, according to the invention.

FIG. 9 illustrates a circuit diagram of the apparatus of the invention. The temperature sensor 9 is an optoelectronic pyrometer, either luminance of color. Optically coupled to the temperature sensor 9 is an optomechanical attachment 87 of the scanning unit 17, which is a Weyler rotating drum. Mounted on the periphery of the mirrors of the drum are magnetic projections 88 that pass through the slit of the magnetic circuit of a clock pulse transmitter 89. An electromagnetic winding 90 of the clock pulse transmitter 89 has its one end connected to one of the plates of a capacitor 91 having its other plate coupled to a first lead of a resistor 92 and to a diode 93. The other end of the winding 90 and a second lead of the resistor 92 are coupled to a grounding bus. The cathode of the diode 93 is coupled to the R input of a flip-flop 94 having its output coupled to one of the inputs of an AND gate 95 that has its other input coupled to the output of a clock pulse generator 96. The output of the AND gate 95 is coupled to the input of a pulse counter 97 having its outputs coupled to the inputs of a decoder 98 and of an OR gate 99 that has its output coupled to the S input of the flip-flop 94. Outputs $100_1, \ldots, 100_i, \ldots, 100_n$ of the decoder 98 are coupled to the control input 16 of the switching unit 15.

The temperature setter 13 is built around a potentiometer 101 that has its one end coupled to a voltage source and has its other end coupled to the grounding bus. A slider 102 of the potentiometer 101 is coupled to the input 12 of the comparison unit 11, said input 12 being provided by the non-inverting input of an operational amplifier 103. The feedback related to the inverting input of the operational amplifier 103, which inverting input is the input 10 of the comparison unit 11, includes a resistor 104. The inverting input of the operational amplifier 103 is coupled to the input of the temperature sensor 9, while the output of the operational amplifier 103 is coupled to the data input 14 of the switching unit 15. That data input 14 is coupled to contacts $105_1, \ldots, 105_i, \ldots, 105_n$ of double-throw switches that have their control elements $106_1, \ldots, 106_i, \ldots, 106_n$ coupled to respective outputs $100_1, \ldots, 100_i, \ldots, 100_n$ of the decoder 98. Contacts $107_1, \ldots, 107_i, \ldots, 107_n$ constitute a multichannel data output of the switching unit 15 and are coupled respectively to corresponding outputs of accumulation capacitors $108_1, \ldots, 108_i, \ldots, 108_n$ used as the store locations of the memory unit 18. The other outputs of the accumulation capacitors $108_1, \ldots, 108_i, \ldots, 108_n$ are coupled to immovable contacts $109_1, \ldots, 109_i, \ldots, 109_n$ of the switches that have their movable contacts $110_1, \ldots, 110_i, \ldots, 110_n$ operated as a multichannel data output of the memory unit 18 and coupled to the input of the signal forming unit 83. The latter is an operational amplifier 111 having a transfer ratio of 1/n where n is the number of the elementary areas $2_i$ (FIG. 1). The operational amplifier 111 (FIG. 9) has its non-inverting input coupled to the grounding bus and has its inverting input coupled, via resistors $112_1, \ldots, 112_i, \ldots, 112_n$ and the contacts $109_1, \ldots, 109_i, \ldots, 109_n$ and $110_1, \ldots, 110_i, \ldots, 110_n$, to corresponding store locations of the memory unit 18, namely, to the capacitors $108_1, \ldots, 108_i, \ldots, 108_n$. The inverting input of the operational amplifier 111 is coupled to its output via a resistor 113 and a capacitor 114 connected in parallel.

The output of the signal forming unit 83 is coupled, via a resistor 115, to the input of the power control unit 21 that is operated to control, for example, the power of an electron beam impinging on the heating surface 1 of the object. The power control unit 21 includes an operational amplifier 116 provided with a feedback related to the non-inverting input thereof via a resistor 117. The inverting input of the operational amplifier 116 is coupled to a slider 118 of a potentiometer 119 that has its one end coupled to the grounding bus and has its other end coupled to the minus side of the voltage source. The output of the operational amplifier 116 is coupled, via a power amplifier 120, to a filament circuit 121 of a cathode 122 of an electron gun.

The store locations of the memory unit 18, which are the accumulation capacitors $108_1, \ldots, 108_i, \ldots, 108_n$, are coupled to the inverting input of an operational amplifier 125 via the contacts $109_1, \ldots, 109_i, \ldots, 109_n$ and $110_1, \ldots, 110_i, \ldots, 110_n$ of the switches and via resistors $123_1, \ldots, 123_i, \ldots, 123_n$ of a delay unit 124. A feedback path of the inverting input of the operational amplifier 125 is provided by means of a resistor 126, while the non-inverting input of the operational amplifier 125, which is the input 84 of the signal forming unit 85, is coupled to the resistor 115.

The signal forming unit 19 is a ratio-type converter comprised of resistors 127,128 and an operational amplifier 129 that has its inverting input coupled to the resistors 127,128 and has its non-inverting input coupled to the grounding bus. The other end of the resistor 127 is coupled to the output of the signal forming unit 85 whereas the other end of the resistor 128 is coupled to the output of the operational amplifier 129, which latter output is used as the output of the signal forming unit 19 and is coupled to the input of the memory unit 23.

The memory unit 23 is built around accumulation capacitors $130_1, \ldots, 130_i, \ldots, 130_n$ which have their first ends coupled, via the contacts of switches $131_1, \ldots, 131_i, \ldots, 131_n$ to the output of the operational amplifier 129. The second ends of the capacitors $130_1, \ldots, 130_i, \ldots, 130_n$ are coupled, via the contacts of switches $132_1, \ldots, 132_i, \ldots, 132_n$ and via resistors $133_1, \ldots, 133_i, \ldots, 133_n$, to the inverting input of an operational amplifier 134, a feedback path to that inverting input having provided by virtue of a resistor 135. Coupled to the non-inverting input of the operational amplifier 134 via resistors $136_1, \ldots, 136_i, \ldots, 136_n$ and via the contacts of switches $137_1, \ldots, 137_i, \ldots, 137_n$ are the sliders of potentiometers $138_1, \ldots, 138_i, \ldots, 138_n$, the latter having their ends connected respectively to the grounding bus and the supply source. The control elements of the switch $137_1, \ldots, 137_i, \ldots, 137_n$ are coupled to outputs $139_1, \ldots, 139_i, \ldots, 139_n$ of a decoder 140. The inputs of the latter are coupled to the outputs of analog-to-digital converters 141, 142 which are connected respectively to the control units 28,29 operated to control the movement of the energy source 4. The analog-digital converters 141,142 employ the circuits described in the block entitled "Multichannel Analog-to-Digital Converters" by E. M. Shushkov and M. B. Tsodikov, the "Energya" Publishers, 1975.

The inputs of the digital-to-analog converters 141, 142 provide respectively the control inputs 82,81 of the switch unit 58 (FIG. 7). The output of the operational amplifier 134 (FIG. 9) is the output of the switch unit 58 (FIG. 7) and is coupled, via a resistor 143, to the input 59 of the integrator 60 built around an operational amplifier 144, a feedback path being provided to the inverting input thereof by means of a capacitor 145 and a switch 146. The inverting input of the operational amplifier 144 is the input 59 of the integrator 60, while the non-inverting input of the operational amplifier 144 is coupled to the grounding bus. The output 63 of the integrator 60 is coupled to the threshold network 62.

The threshold network 62 is built around an operational amplifier 147 having its inverting input coupled to the output 63 of the integrator 60 and having its non-inverting input coupled to a potentiometer 148. The latter has its ends coupled to the grounding bus and supply source. A feedback path to the non-inverting input of the operational amplifier 147 is provided by virtue of a resistor 149. The output of the operational amplifier 147, which is the output of the network 62, is coupled to the control element of the switch 146, which is the input 61 of the integrator 60.

The output 63 of the integrator 60 is coupled to the input of the conversion unit 64 which may utilize a circuit described in the article entitled "Automatic Adjustment of a Multipurpose Converter Providing Piecewise Linear Approximation" in the Journal of Automatics and Telemechanics, No. 10, vol. XXIII, 1962, pp. 1343–1351. The output of the conversion unit 64 is coupled to the input 65 of the multiplication unit 66 having its input 67 coupled to the output of the switch unit 58 (FIG. 7). An integrated circuit multiplier can be used as the multiplication unit 66 (FIG. 9).

The output of the multiplication unit 66 is coupled via a resistor 150 to the input of an integrator 68 built around an operational amplifier 151 that has its non-inverting input coupled to the grounding bus and has its inverting input coupled via a capacitor 152 to its own output. The inverting input of the operational amplifier 151 is the input of the integrator 68.

The output of the integrator 68 is coupled to the channel networks 69,75 which comprise respectively the integrators 72, 78 and the multiplication units 71,77.

The channel network 69 also comprises the cosine converter 70, while the channel network 75 also includes the sine converter 76. The inputs of the converters 70,76 are joined together and are coupled to the outputs of the operational amplifier 151, whereas the outputs of the converters are coupled to the inputs 73,79 of the multiplication units 71,72 respectively. The outputs of the multiplication units 71,77 are coupled, via resistors 153,154, via the integrators 72,78, and via power amplifiers 155,156 intended for the deflection signals, respectively, to the units 28,29 that control the movement of the energy source 4.

The cosine and sine converters 70,76 may utilize either cosine and sine potentiometers or diode arrays (cf. B. Ya. Kogan "Electronic Simulating Devices and Their Usage for Investigation of Automatic Control Systems", the "Fizmat" Publishers, Moscow, 1963).

The multiplication units 71, 77 are similar to the multiplication unit 66.

The integrators 72,78 are built around operational amplifiers 157,158 which are connected to capacitors 159,160 providing for feedbacks to their corresponding inverting inputs. The operational amplifiers 157,158 have their non-inverting inputs coupled to the grounding bus and have their inverting inputs coupled to the resistors 153,154 respectively.

Figure 10:
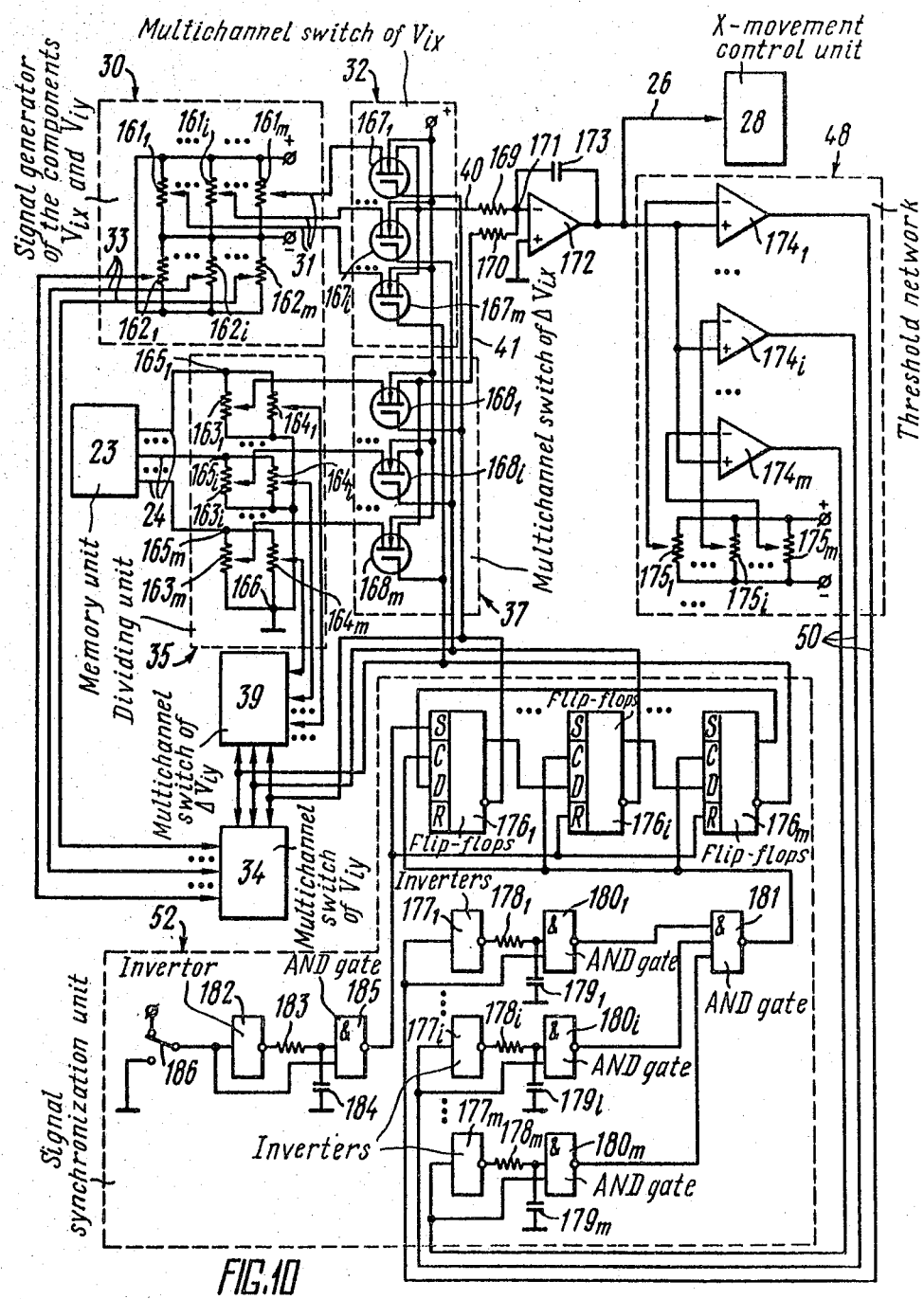
FIG. 10 is a circuit diagram of the functional signal converter used in the case where the path of the energy source is approximated by straight line segments, according to the invention.

FIG. 10 illustrates a circuit diagram of the functional signal converter 25 whose block diagram is shown in FIG. 6. The functional signal converter 25 comprises the signal generator 30 (FIG. 10) adapted to generate the signals representative of the components $V_{ix}$, $V_{iy}$ (FIG. 2) of the velocity $V_i$, said signal generator being built around resistance-type voltage dividers $161_1, \ldots, 161_i, \ldots, 161_m$ (FIG. 10) and $162_1, \ldots, 162_i, \ldots, 162_m$ that are connected in parallel with the voltage sources.

The signal dividing unit 35 comprises resistance-type voltage dividers $163_1, \ldots, 163_i, \ldots, 163_m$ and $164_1, \ldots, 164_i, \ldots, 164_m$ which constitute corresponding pairs connected in parallel and have common points $165_1, \ldots, 165_i, \ldots, 165_m$, which are connected to the outputs 24 of the memory unit 23, and have a point 166 connected to the grounding bus.

The multichannel switches 32,37 are built around field-effect transistors $167_1, \ldots, 167_i, \ldots, 167_m$ and $168_1, \ldots, 168_i, \ldots, 168_m$, respectively, the substrates of the transistors being joined together and coupled to the voltage source. The sources of the transistors $167_1, \ldots, 167_i, \ldots, 167_m$ and $168_1, \ldots, 168_i, \ldots, 168_m$ are coupled to resistors 169,170, respectively. The drains of the transistors $167_1, \ldots, 167_i, \ldots, 167_m$ and $168_1, \ldots, 168_i, \ldots, 168_m$ which are the data inputs of the switches 32,37, are coupled respectively to the sliders of the dividers $161_1, \ldots, 161_i, \ldots, 161_m$ of the signal generator 30 and to the sliders of the dividers $163_1, \ldots, 163_i, \ldots, 163_m$ of the signal dividing unit 35. The multichannel swtiches 34,39 utilize similar circuitries, the data inputs of the switch 34 being coupled to the sliders of the dividers $162_1, \ldots, 162_i, \ldots, 162_m$ of the signal generator 30, and the data inputs of the switch 39 being coupled to the sliders of the dividers $164_1, \ldots, 164_i, \ldots, 164_m$ of the signal dividing unit 35.

The resistors 169,170 have a common point 171 coupled to the inverting input of an operational amplifier 172 provided with a feedback path into which a capacitor 173 is inserted. The output of the operational amplifier 172 is coupled to the input of the control unit 28 and to the non-inverting inputs of operational amplifiers $174_1, \ldots, 174_i, \ldots, 174_m$ of which the threshold network 48 is comprised. The inverting inputs of the operational amplifiers $174_1, \ldots, 174_i, \ldots, 174_m$ are coupled to the sliders of resistance-type voltage dividers $175_1, \ldots, 175_i, \ldots, 175_m$ which are coupled in parallel to the voltage source.

The signal synchronization unit 52 comprises a shift register built around D-flip-flops $176_1, \ldots, 176_i, \ldots, 176_m$ and pulse forming networks adapted to form pulses using the leading edge of the output signals provided by the threshold network 48, these pulse forming networks having inverters $177_1, \ldots, 177_i, \ldots, 177_m$, resistors $178_1, \ldots, 178_i, \ldots, 178_m$, capacitors $179_1, \ldots, 179_i, \ldots, 179_m$ and AND gates $180_1, \ldots, 180_i, \ldots, 180_m$ having their outputs coupled to an AND gate 181.

In addition, the signal synchronization unit 52 includes a network to set the initial state of the shift register, which network utilizes an inverter 182, a resistor 183, a capacitor 184, an AND gate 185 and a switch 186.

The complement outputs of the D-flip-flops $176_1, \ldots, 176_i, \ldots, 176_m$ are coupled to the gates of corresponding transistors $167_1, \ldots, 167_i, \ldots, 167_m$ and $168_1, \ldots, 168_i, \ldots, 168_m$ of the multichannel switches 32,37 and to the transistors of the switches 34,39. One input of each of the resistors $178_1, \ldots, 178_i, \ldots, 178_m$ is coupled to the output of a respective one of the inverters $177_1, \ldots, 177_i, \ldots, 177_m$, while the other input of each of the resistors $178_1, \ldots, 178_i, \ldots, 178_m$ is coupled to one input of a respective one of the AND gates $180_1, \ldots, 180_i, \ldots, 180_m$ and to one end of a respective one of the capacitors $179_1, \ldots, 179_i, \ldots, 179_m$ which have their other ends coupled to the grounding bus. The other input of each of the AND gates $180_1, \ldots, 180_i, \ldots, 180_m$ is joined together with the input of a respective one of the inverters $177_1, \ldots, 177_i, \ldots, 177_m$ and is coupled to the output of a respective one of the operational amplifiers $174_1, \ldots, 174_i, \ldots, 174_m$ of the threshold network 48. The output of the AND gate 181 is coupled to the C inputs of the D-flip-flops $176_1, \ldots, 176_i, \ldots, 176_m$. The R inputs of the D-flip-flops $176_2, \ldots, 176_i, \ldots, 176_m$ are joined together and coupled to the output of the AND gate 185 and to the S input of the D-flip-flop $176_1$. The true outputs of the D-flip-flops $176_1, \ldots, 176_i, \ldots, 176_m$ are coupled to the control inputs of the following D-flip-flops $176_2, \ldots, 176_{m-1}$, while the true output of the D-flip-flop $176_m$ is coupled to the control input of the D-flip-flop $176_1$.

A resistor 183 has its one end coupled to the output of an inverter 182 and has its other end coupled to one input of an AND gate 185 and to one end of a capacitor 184 which has its other end coupled to the grounding bus. The other end of the AND gate 185 is joined together with the input of the inverter 182 and is coupled to an immovable contact of a switch 186 that has its one movable contact coupled to the voltage source and has its other movable contact coupled to the grounding bus.

The method of the invention is as follows. The energy source 4 (FIG. 1) is moved along the predetermined path 3 on the heating surface 1 (FIG. 1 of the object with the velocity $V_1, \ldots, V_i, \ldots, V_n$ corresponding to the elementary areas $2_1, \ldots, 2_i, \ldots, 2_n$ into which the heating surface 1 is divided. For each elementary area $2_i$, the error signal $Q_i$ (FIG. 4) is formed and remembered which is representative of a difference between the predetermined and the measured temperature of that area $2_i$. The temperature on the areas $2_1, \ldots, 2_i, \ldots, 2_n$ (FIG. 1) can be measured either concurrently or in a sequential manner when the data is picked up along the scanning path 5. Using the error signals $Q_i$ (FIG. 4), one can provide the signal representative of the power of the energy source 4 (FIG. 1) and the signals $U_2$ (FIG. 4) representative of the correction value $\Delta V_i$ (FIG. 2) for the velocity $V_i$ of the energy source 4 at the areas $2_i$ (FIG. 1). The signal so obtained are converted functionally into the signals $U_y$, $U_x$ (FIG. 4) representative respectively of the components 8,7 (FIG. 2) determined by the law of movement of the energy source 4 (FIG. 1), related to respective rectangular axes Y,X and providing for the movement of the energy source 4 relative to these axes. The signals $U_y$, $U_x$ tend to vary with time in a manner that the energy source 4 is caused to move along the predetermined path 3 and the velocity $V_i$ of the energy source 4 at a given area $2_i$ tends to vary according to the signal $U_2$ (FIG. 4) representative of the correction value $\Delta V_i$ (FIG. 2) with the result that the difference between the predetermined and the measured temperature at that area $2_i$ is decreased.

In the case where the energy source 4 is moved along the path 3 in a discrete manner and is caused to stay for a certain time interval at one or more points of a given area $2_i$, or is moved over a given areas $2_i$ with a variable velocity, the velocity $V_i$ at the given area $2_i$ is an average velocity which is $$V_i = (\Delta S / \Delta t) \tag{1}$$

where $\Delta S$ is the length of an arc portion of the path 3, and $\Delta t$ is the total time during which the energy source is within the area $2_i$.

There are two methods according to which the signals $U_2$ (FIG. 4) representative of the correction values $\Delta V_i$ (FIG. 2) for the velocity $V_i$ of the energy source 4 at the area $2_i$ are converted to the signals $U_y$, $U_x$ (FIG. 4) representative respectively of the components 7,8 (FIG. 2) determined by the law of movement of the energy source 4 (FIG. 1) and related to the rectangular axes Y,X respectively.

According to the first method, the path 3 is approximated using the straight line segments 6. The projection of the segments 6 of the approximating broken line on the rectangular axes X,Y are then determined. For a segment $6_i$ the components $V_{ix}$, $V_{iy}$ of the velocity $V_i$ of the energy source 4 (FIG. 1), related to the rectangular axes Y,X are determined in proportion to the value of the projection of the segment $6_i$ $$V^2_{ix} + V^2_{iy} = V^2_i \tag{2}$$

where $V_i$ is the velocity of the energy source 4 (FIG. 1) at the segment $6_i$.

During the control of the energy source 4, its velocity $V_i$ is varied in accordance with the difference of the predetermined and the measured temperature, provided by the signals $U_2$ (FIG. 4) representative of the correction value $\Delta V_i$ (FIG. 4) for the velocity $V_i$. To this end, the signal $U_2$ is divided into two signals, which are representative respectively of the correction values $\Delta V_{ix}$, $\Delta V_{iy}$ (FIG. 2) of corresponding components $V_{ix}$, $V_{iy}$, so that the sum of the squares of the correction values $\Delta V_{ix}$, $\Delta V_{iy}$ is equal to the square of the correction value $\Delta V_i$, according to the equation as follows $$\Delta V^2_{ix} + \Delta V^2_{iy} = \Delta V^2_i \tag{3}$$

In addition, the relationship of the correction values $\Delta V_{ix}$, $\Delta V_{iy}$ must be equal to the relationship of the components $V_{ix}$, $V_{iy}$, thereby providing for a condition in which the proper form of the path 3 is maintained during the control of the velocity $V_i$. The resultant signals representative of the components $V_{ix} + \Delta V_{ix}$, $V_{iy} + \Delta V_{iy}$ of the velocity $V_i$ are determined by summing the signals representative of the components and the signals representative of the correction values $\Delta V_{ix}$, and $\Delta V_{iy}$. After that, the resultant signals are integrated with the result that the control signals are provided which are used to control the movement of the energy source 4 (FIG. 1) relative to the rectangular axes X,Y.

The above-mentioned embodiment of the method of the invention provides for an appreciably good accuracy with which the path 3 can be represented in the cases where it has a small curvature or is approximated using the piecewise linear function. If the path 3 has a large curvature, a more accurate approximation can be attained as follows. The path 3 (FIG. 3) is divided into segments using points $B_0$, $B_1$, ..., $B_i$, ..., $B_m$ and the segments are approximated by virtue of circle arcs having radii $R_0$, $R_1$, ..., $R_i$, ..., $R_{m-1}$, respectively. The curvature $x_i$, where $i = 0, \ldots, m-1$, of a given segment of the path 3 is the value that is the reciprocal of the radius $R_i$ of the arc of the approximating circle. As a result, a piecewise continuous function $x(s)$, $0 \leq s \leq S$ of the curvature of the path 3 is obtained, where s is the length of the arc of the path 3, measured from the initial point $B_0$, and S is the length of the whole path 3 from the initial point $B_0$ to the final point $B_m$, namely, the distance passed by the energy source 4 along the path 3. The control signals $U_4$ (FIG. 4) are obtained by summing the signals $U_3$ representative of the velocity $V_i$ (FIG. 2) and the signals $U_2$ (FIG. 4) representative of the correction value $\Delta V_i$ (FIG. 2) for the area $2_i$ (FIG. 1).

The control signals $U_4$ (FIG. 4) are switched over in a given time sequence and the signals $U_4$ so obtained are representative of the desired velocity $V_i + \Delta V_i$ (FIG. 1) of the energy source 4 at the elementary areas $2_i$. After that, the signal $U_4$ is integrated and the signal $U_5 = kS$ (FIG. 4) is obtained which is representative of the distance S passed by the energy source 4 (FIG. 1) along the path 3, where k is a constant factor. The signal $U_5$ (FIG. 4) corresponds to the law of movement of the energy source 4 (FIG. 1) along the path 3.

When it is necessary for the energy source 4 to pass along the path 3 several times, two cases are possible after it reaches the final point $B_m$ (FIG. 3): the energy source 4 (FIG. 1) continues to move in the reverse direction from the point $B_m$ to the point $B_0$ or it is returned to the initial point $B_0$ and begins to move from the point $B_0$ to the point $B_m$. In the first case, the control signals $U_4$ (FIG. 4) are switched over in a sequence which is the reverse of the original sequence and the signal $U_3$ is inverted before integration. In the second case, the signal $U_5$ is set to zero and the control signals $U_4$ are then switched over in accordance with the original sequence.

The signal $U_5$ is then converted in accordance with the relationships determined by the formulas of differential geometry. The signal $U_6$ (FIG. 4) representative of the form of the path 3 (FIG. 1) is given by $$U_6 = (U_5/K) = x(S) \tag{4}$$

The signal $U_7$ (FIG. 4) is provided by integrating the signal $U_6$ which is multiplied previously by the signal $U_4$. Then, the sine and cosine values of the signal $U_7$, after multiplication by the signal $U_4$, are integrated simultaneously, thereby providing the signals $U_y$, $U_x$ representative of the components 7,8 (FIG. 4) determined by the law of movement of the energy source 4 (FIG. 1) and related to the rectangular axes Y,X.

$$U_x(t) = \int_0^t \cos\left(\frac{U_7}{k}\right) \cdot U_4 \cdot dt + kX_0 = \quad (5)$$

$$k\left[\int_0^t \cos\phi(t)ds/dtdt + X_0\right]$$

$$U_y(t) = \int_0^t \sin\left(\frac{U_7}{k}\right) \cdot U_4 \cdot dt + kY_0 =$$

$$k\left[\int_0^t \sin\phi(t)ds/dtdt + Y_0\right]$$

If the energy source 4 (FIG. 1) performs periodical or approximately periodical movement along the path 3, its power is then varied in proportion to the average signal Q (FIG. 4) corresponding to an average value of the error signals $Q_i$. In this case, the signal $U_2$ representative of the correction value $\Delta V_i$ of the velocity $V_i$ of the energy source 4 (FIG. 1) at the elementary area $2_i$ is formed using the signals $\Delta Q$ representative of the difference $\Delta Q_i$ of the average signal Q the error signals $Q_i$.

The apparatus of the invention (FIG. 5) operates in the following manner.

At the beginning of the operation, the signals obtainable from the output of the memory unit 23 adapted to store the signals $U_2$ (FIG. 4) representative of the correction value $\Delta V_i$ (FIG. 2) of the velocity $V_i$ are equal to zero. The functional signal converter 25 (FIG. 5) produces the signals $U_y$, $U_x$ (FIG. 4) representative of the components 7,8 (FIG. 2) determined by the law of movement of the energy source 4 (FIG. 1) and related to the rectangular axes Y,X. The signal representative of the power of the energy source 4 (FIG. 5) is delivered, at the beginning of the operation, from the output of the signal forming unit 19 to the input of the power control unit 21. The signals $U_x$, $U_y$ (FIG. 4) are applied to the inputs of the units 28,29 (FIG. 5) adapted to control the movement of the energy source 4. As a result, the energy source 4 having a preset power moves along the predetermined path 3 on the heating surface 1 of the object in accordance with the given law of movement. The temperature sensor 9 measures the temperature of the heating surface 1 of the object at the elementary areas $2_i$ in a manner that the temperature is measured simultaneously at all areas $2_i$ or is measured sequentially along the scanning path 5. The output signal from the temperature sensor 9 is applied to the input 10 of the comparison unit 11 and the input 12 thereof receives the signal from the output of the temperature setter 13. The output signal of the comparison unit 13 (FIG. 5), which is the error signal $Q_i$ (FIG. 4) representative of the difference between the predetermined and the measured temperature, is applied to the input 14 of the switching unit 15. The input 16 of the latter receives the signal from the output of the scanning unit 17 that provides for the scanning movement of the temperature sensor 9 and for the control of the switching unit 15. Each store location of the memory unit 18 corresponds to a certain elementary area $2_i$ of the heating surface 1 of the object. The switching unit 15 operates in a manner that the memory unit 18 stores the signals representative of the difference between the predetermined and the measured temperature in the store locations corresponding to the areas $2_i$. The signals from the memory unit 18 are applied to the signal forming unit 19. The output 20 of the latter provides a signal representative of the correction value of the power of the energy source 4, which is applied to the input of the power control unit 21. The signal forming unit 19 also produces the signals $U_2$ (FIG. 4) representative of the correction values $\Delta V_i$ (FIG. 2) of the velocity of the energy source 4 (FIG. 5). The signals $U_2$ are delivered from the output 22 to the memory unit 23 and then to the functional signal converter 25 (FIG. 5) whose output produces the signals $U_x$, $U_y$ (FIG. 4) representative of the components 8,7 (FIG. 2) determined by the law of the movement of the energy source 4 (FIG. 1), related to the rectangular axes X,Y and providing for the correction of the law of movement of the energy source 4 along the path 3.

In the case where the path 3 (FIG. 2) is approximated using the straight line segments 6, the functional signal converter 25 (FIG. 6) operates as follows. The signal $U_2$ (FIG. 4) representative of the correction value $\Delta V_i$ (FIG. 2) of the velocity $V_i$ is delivered from the output 24 (FIG. 6) of the memory unit 23 to the input of the comparison unit 35 in which it is divided into two signals. One signal is representative of the correction value $\Delta V_{ix}$ (FIG. 2) of the component $V_{ix}$ of the velocity $V_i$ related to the rectangular axis X and is passed from the output 36 (FIG. 6) of the signal dividing unit 35 to the data inputs of the multichannel switch 37. The other signal is representative of the correction value $\Delta V_{iy}$ (FIG. 2) of the component $V_{iy}$ of the velocity $V_i$ related to the rectangular axis Y and is passed from the output 38 (FIG. 6) of the signal dividing unit 35 to the data inputs of the multichannel switch 34. At the same time, the signals representative of the components $V_{ix}$, $V_{iy}$ (FIG. 2) of the velocity $V_i$ are applied from the outputs 31,33 (FIG. 6) of the signal generator 30 to the data inputs of corresponding multichannel switches 32,34. To synchronize the operation of the multichannel switches 32,34,37,39 in accordance with a sequential movement of the energy source 4 (FIG. 4) along the segments 6 (FIG. 2) of the path 3, their control inputs receive simultaneously a signal from the output of the synchronization unit 52 (FIG. 6). The signal being switched, obtainable from the outputs of the switches 32,37 and the switches 34,39 respectively, are delivered in pairs to the inputs 40, 41,43,44 of the adders 42,45 and the summation signals are applied to the inputs of the integrators 46,47. The outputs of the integrators 46,47 provide the signals that tend to increase linearly at a rate proportional to the signals at their inputs. The output signals of the integrators 46,47 are applied to the inputs of the control units 28,29 and to the inputs of the threshold networks 48,49 which operate to quantize the signals according to the segments 6 of the path 3 (FIG. 2). The output signals of the threshold networks 48,49 (FIG. 6) are applied to the input of the synchronization unit 52 which controls the operation of the multichannel switches 32,34,37,39.

In the case where the path 3 (FIG. 3) of the energy source 4 (FIG. 1) is approximated by the arcs of a circle, the functional signal converter 25 (FIG. 7) operates as follows. The signal $U_2$ (FIG. 4) representative of the correction value $\Delta V_i$ (FIG. 2) of the velocity $V_i$ at the elementary area $2_i$ (FIG. 1) is applied to the input group 56 (FIG. 7) of the adder unit 55 and the input group 54 of the latter receives the output signal $U_3$ (FIG. 4) of the velocity setter 53 (FIG. 7), representative of the velocity $V_i$ (FIG. 2). The control signals from the output of the adder unit 55 (FIG. 7) are applied to the data inputs 57 of the switch unit 58 and the control inputs 81,82 of the latter receive the signals $U_x$, $U_y$ (FIG. 4) representative of the components 8,7 (FIG. 2) determined by the law of movement of the energy source 4 (FIG. 1) and related to the rectangular axes X,Y, the signals $U_x$, $U_y$ being delivered from the outputs of the integrators 72,78 (FIG. 7). These signals are employed to control the operation of the switch unit 58 in a manner that its output provides successive signals $U_4$ (FIG. 4) representative of the desired velocity ($V_i + \Delta V_i$) (FIG. 2) of the energy source 4 (FIG. 1) at the segments of the path 3.

The output signal $U_4$ (FIG. 4) of the switch unit 58 (FIG. 7) is integrated in the integrator 60 which therefore provides the signal $U_6$ (FIG. 4) representative of the distance S passed by the energy source 4 (FIG. 1) along the path 3. At the end of the distance S, in the case where the energy source 4 performs non-returnable multicycle movement, the signal at the output of the integrator 60 (FIG. 7) is zero, which is attained by means of the threshold network 62. This provides for a condition in which the energy source 4 (FIG. 1) is transferred to the initial point $A_0$ of the path 3.

In the distance conversion unit 64 (FIG. 7), the signal $U_5$ (FIG. 4) representative of the distance S passed by the energy source 4 (FIG. 1) along the path 3 from the initial point $A_0$ is converted to the signal $U_6$ (FIG. 4) representative of the curvature $x_i$ of the path 3 (FIG. 1) at that point thereof which is occupied by the energy source 4 at the given point in time. The signal $U_6$ (FIG. 4) is multipled by the signal $U_2$ with the result that a transfer from the distance variable S to the time variable t is effected. The product $[x(S)ds/dt]$ is integrated in the integrator 68 (FIG. 7) and the signal $U_7$ (FIG. 4) is therefore produced which is representative of the angle $\phi$ of rotation of the vector of the velocity of the energy source 4 moved along the path 3 (FIG. 1). The angle $\phi$ is measured with respect to the initial position of the vector $V_0$ (FIG. 3) of the velocity, which is in coincidence with the axis X.

The signal $U_7$ (FIG. 4) is converted in the channel networks 69,75 (FIG. 7) into the signals $U_x$, $U_y$ (FIG. 4) representative of the components 8,7 (FIG. 2) determined by the law of movement of the energy source 4 (FIG. 1) and related to the rectangular axes X,Y. The conversion is effected by means of the cosine converter 70 (FIG. 7) for the axis X (FIG. 1) and the sine converter 76 (FIG. 7) for the axis Y (FIG. 1), as well as the multiplication units 70,77 (FIG. 7) and the integrators 72,78.

Figure 8:
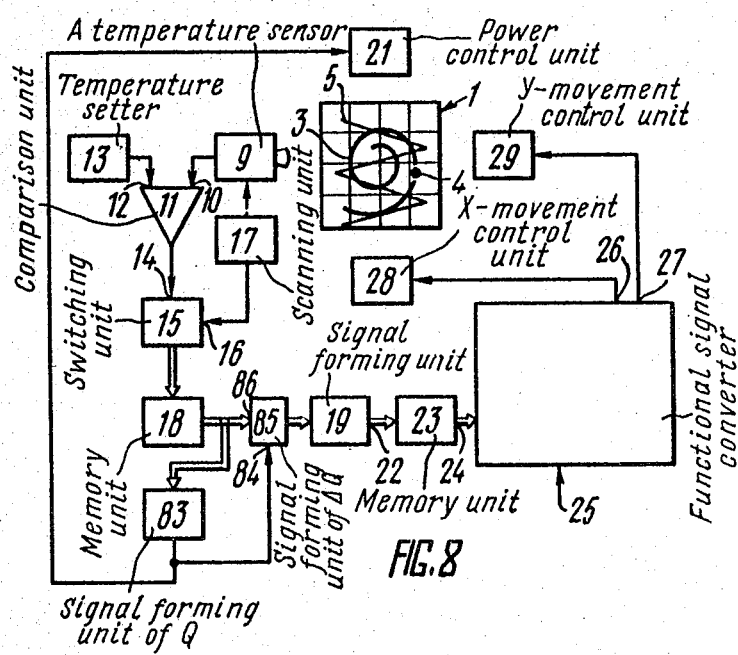
FIG. 8 is a block diagram of the apparatus for controlling the movable energy source whose power is controlled in accordance with the average value of the signal representative of the difference between the predetermined and the measured temperature of the heating surface of an object, according to the invention.

In the case where the energy source 4 (FIG. 1) performs a periodical or approximately periodical movement during the heating of the object, the velocity $V_i$ of the source at the elementary area $2_i$ is controlled so that its period of movement is held constant. To this end, the error signals $Q_i$ (FIG. 4) are delivered from the memory unit 18 (FIG. 8) to the input of the signal forming unit 83 in which the average signal Q is formed. According to this signal, the power of the energy source 4 (FIG. 1) is controlled by means of the power control unit 21 (FIG. 8). When the signal at the output of the power control unit 21 is equal to zero, the power of the energy source 4 is maintained at the nominal level. A positive signal at the output of the signal forming unit 83 provides for an increase in the total power of the energy source 4 relative to the nominal level, while a negative signal at the output of the signal forming unit 83 tends to decrease the total power of the energy source 4 relative to the nominal level. As a result, the total amount of the energy received by the object depends on the average temperature of the latter. The received energy is distributed on the elementary areas $2_i$ in accordance with a distribution of the associated velocities relative to the average velocity of the energy source 4. For this, the signals $\Delta Q$ (FIG. 4) representative of the difference $\Delta Q_i$ between the average signal Q and the error signals $Q_1$ and produced in the signal forming unit 85 (FIG. 8) are applied to the input of the signal forming unit 19 which provides the signals $U_2$ (FIG. 4) representative of the correction value $\Delta V_i$ (FIG. 2) of the velocity $V_i$.

The apparatus of the invention having a circuit diagram shown in FIG. 9 operates as follows. The heating surface 1 of an object, for example, an ingot, is heated using the movable energy source 4, for example, an electron beam that is generated by the cathode 122 of an electron gun of a thermal electron-beam installation. The control units 28,29, which are electromagnetic deflection coils in the embodiment, are adapted to control the movement of the energy source 4 along the heating surface 1 of the object.

The unit 28 provides for the movement of the energy source 4 along the axis X, while the unit 29 provides for the movement of the energy source along the axis Y, the axes X, Y being rectilinear ones. This is attained with the help of the signals $U_x$, $U_y$ (FIG. 4) applied to the inputs of the units 28,29 and produced in the channel networks 69,75 in accordance with the signals representative of the path of movement and the velocity related to that path. The form of the path is selected by the operator who operates a setter adapted to set the path 3 (curvature $\chi$), which setter is the conversion unit 64 adapted to convert the signal $U_5$ (FIG. 4) representative of the distance S passed by the energy source 4 (FIG. 9) to the signal $U_6$ (FIG. 4) representative of the curvature $\chi$ of the path 3 (FIG. 9).

The absolute values of the velocity $V_i$ of the energy source at different segments of the path 3 are selected by the operator who operates the sliders of the potentiometers $138_1, \ldots, 138_m$ of the velocity setter 53 (FIG. 7) and are corrected automatically according to the signals provided by the temperature sensor 9 (FIG. 9), the latter signals being used to correct the power of the energy source 4 too.

The temperature at all required points of the heating surface 1 of the object is measured in succession by means of the temperature sensor 9 including the scanning optomechanical attachment 87 which is a mirror-type Weyler drum. The measurement result is compared in the operational amplifier 103 to the signal representative of the predetermined temperature and produced by the potentiometer 101. The signal $\Delta U$ (FIG. 4) so obtained is divided into n elementary error signals $Q_i$ (i = 1, 2, ..., n) in the switching unit 15 (FIG. 9). The elementary error signals $Q_i$ (FIG. 4) are remembered in the locations utilizing the accumulation capacitors $108_1, \ldots, 108_i, \ldots, 108_n$ (FIG. 9) and a train of clock pulses from the scanning unit 17 is delivered in this case.

The data from the store locations of the memory unit 18 is delivered sequentially to the inputs of the signal forming units 83,85. The data is fetched by making sequentially the contacts $109_1, \ldots, 109_i, \ldots, 109_n$ and $110_1, \ldots, 110_i, \ldots, 110_n$ of the switches of the store locations. The stored data is used to form the signals $U_2$ (FIG. 4) representative of the correction value $\Delta V_i$ (FIG. 2) of the velocity $V_i$ and the signals representative of the correction value of the power of the energy source 4 (FIG. 9).

In the case where the energy source 4 performs a periodical movement on the heating surface 1 of the object, the signal representative of the correction value of its power is produced by the operational amplifier 111 (FIG. 9) having a transfer ratio of 1/n.

The error signals $Q_i$ (FIG. 4) from the memory unit 18 are applied one at a time to the input of the operational amplifier 111 with the result that its output, after arrival of the latter, nth, error signal $Q_i$ from the nth store location, provides the average signal $$Q = \frac{1}{n} \sum_{i=1}^{n} Q_i.$$

In the operational amplifier 116 (FIG. 9) the average signal Q is added to the signal representative of the power of the energy source 4 and delivered from the output of the potentiometer 119 and the power amplifier 120 operates to control the current through the filament circuit 121 of the cathode 122 of the electron gun.

The clock pulses to control the switches are produced in the scanning unit 17. To this end, the mirror-type drum of the scanning attachment 87 is provided with magnetic projections 88 adapted to form in the electromagnetic winding 90 of the clock pulse transmitter 89 the clock pulses corresponding to the beginning of scanning a new line. These signals are differentiated in an R-C circuit comprised of the resistor 92 and the capacitor 91 and are used to control the operation of the flip-flop 94. When a pulse appears at the input of the flip-flop 94, the pulses from the clock pulse generator 96 pass through the AND gate 95 to the counter 97 which is operated in conjunction with the AND gate 99 to control the operation of the decoder 98. As a result, the scanning of each line requires that a pulse train of n/p pulses, where p is the number of the mirrors of the drum, be provided by the decoder 98 which produces a pulse train of n pulses during the overall scanning period for the whole heating surface 1 of the object, equal to the period of rotation of the drum.

The signals $U_2$ (FIG. 4) representative of the correction value $\Delta V_i$ (FIG. 2) of the velocity $V_i$ and delivered from the memory unit 18 to the signal forming unit 85 are delayed in the delay unit 124 by the time interval equal to the time during which n error signals $Q_i$ (FIG. 4) are integrated in the unit 85 (FIG. 9). This delay causes a production at the output of the operational amplifier 125 a sequence of signals $\Delta Q$ (FIG. 4). The signals $\Delta Q$ are then converted proportionally to the signals $U_2$ by means of the operational amplifier 129 (FIG. 9) and resistors 127,129. In the given embodiment, the signals $\Delta Q$ (FIG. 4) are converted to the signals $U_4$ in accordance with a simplest law which is a proportional one. In the general case, the conversion can be effected according to a more complex law. The signals $U_4$ are then remembered in a given succession in the memory unit 23 (FIG. 9) by means of the accumulation capacitors $130_1, \ldots, 130_i, \ldots, 130_n$ and the switches $131_1, \ldots, 131_i, \ldots, 131_n$.

To form the signals $U_3$ (FIG. 4) representative of the velocity $V_i$ (FIG. 2) of the energy source 4 for each of m segments 6 into which the path 3 is divided, use is made of the velocity setter 53 (FIG. 9), the adder unit 55 and the switch unit 58. In this case, the memory unit 23 (FIG. 9) provides the signals $U_2$ (FIG. 4) in a time sequence determined by those points in time at which the energy source 4 is transferred from one segment 6 (FIG. 2) of the path to another. The signals $U_2$ (FIG. 4) are added to the signals $U_3$ produced in the velocity setter 53 (FIG. 9) with the help of the potentiometers 138 of the adder unit 55 (FIG. 7) that includes the operational amplifier 134 (FIG. 9) and resistors $133_1, \ldots, 133_n$ and $136_1, \ldots, 136_n$. These signals are added according to a sequence in which the outputs $139_1, \ldots, 139_i, \ldots, 139_n$ of the decoder 140 provide clock pulses.

The clock pulses are formed in accordance with the signals $U_x$, $U_y$ (FIG. 4) representative of the components 8,7 (FIG. 2) determined by the law of movement of the energy source 4 (FIG. 1) and related to the rectangular axes X,Y. The signals $U_x$, $U_y$ (FIG. 4) are converted by means of the analog-to-digital converters 141,142 (FIG. 9) and the decoder 140 into a train of code pulses which appear at corresponding outputs $139_1, \ldots, 139_i, \ldots, 139_n$ of the decoder 140 each time the energy source 4 is transferred from one segment 6 (FIG. 2) of the path 3 to another. The clock pulses are applied concurrently to the control elements of the switches 132,137 (FIG. 9). As a result, the output of the operational amplifier 134 provides sequentially the signals $U_4$ (FIG. 4). The potentiometers $138_1, \ldots, 138_i, \ldots, 138_n$ (FIG. 9) and the capacitors $130_1, \ldots, 130_i, \ldots, 130_n$ are connected to the input of the operational amplifier 134 in a given succession with the result that the signals $U_4$ (FIG. 4) representative of the desired velocity $V_i + \Delta V_i$ (FIG. 2) along the path 3 are produced.

The signals $U_4$ (FIG. 4) are applied in a given succession to the input of the operation amplifier 144 (FIG. 9) which is operated in conjunction with the capacitor 145 in the integrator mode. When the output signal provided by the operational amplifier 144 reaches a maximal preset level, the switch 146 makes and the integrator 60 assumes the O state. This change is attained by applying a pulse from the output of the threshold network 62 to the control element of the switch 146. The maximum preset level mentioned above is selected by the slider of the potentiometer 148 coupled to the non-inverting input of the operational amplifier 147.

The output signal $U_5$ (FIG. 4) of the integrator 60 (FIG. 9) is representative of the distance S (FIG. 4) passed by the energy source 4 (FIG. 1) along the path 3 by the given point in time t. The distance conversion unit 64 (FIG. 9) may be an apparatus such as one according to the Journal "Automatics", 1962, No. 10, Volume XXIII, pages 1343–1351 which operates to convert the signal $U_5$ (FIG. 4) to the signal $U_6$ representative of the curvature $\chi$ of the segments of the path 3 (FIG. 1) of the energy source 4. The signal $U_6$ (FIG. 4) provided by the output of the distance conversion unit 64 (FIG. 9) is multiplied by the signal $U_4$ representative of the velocity $V_i + \Delta V_i$ (FIG. 2) and the signal so obtained is applied to the input of the integrator 68 (FIG. 9) which converts it to the signal $U_7$ (FIG. 4) representative of the angle $\phi$ of rotation of the vector of the velocity $V_i$ (FIG. 1) of the energy source 4.

The channel networks 69,75 (FIG. 9) are then operated to convert the signal $U_7$ (FIG. 4) to the signals $U_x$, $U_y$ (FIG. 4) representative of the components 8,7 (FIG. 2) determined by the law of movement of the energy source 4 (FIG. 1) along the path 3. To this end, the outputs of the cosine and sine converters 70, 76 (FIG. 9) of the channel networks 69,75 respectively provide the signals $U_9$, $U_8$ (FIG. 4) representative of the cosine and sine values of the signals applied to their corresponding inputs. After that, the signals $U_9$, $U_8$ (FIG. 4) are multiplied by the signal $U_3$ representative of the velocity $V_i$ (FIG. 2) of the energy source 4 (FIG. 1) and the products so obtained are integrated. The integrators 72,78 (FIG. 9) are supplied with the values of the coordinates $X_O$, $Y_O$ (FIG. 2) of the position of the energy source 4 at the initial point in time.

The circuit diagram of the apparatus of the invention for an energy source moved at a low velocity may be implemented using a microprocessor provided with high-speed analog-to-digital and digital-to-analog converters.

The functional signal converter 25 of FIG. 10 operates in the following manner. The resistance-type voltage dividers $161_1, \ldots, 161_i, \ldots, 161_m$ are operated to set the voltages corresponding to the components $V_{ix}$ (FIG. 2) of the velocity $V_i$ of the energy source 4 (FIG. 1) related to the rectangular axis X for the segments 6 (FIG. 2) of the path 3, while the resistance-type voltage dividers $162_1, \ldots, 162_i, \ldots, 162_m$ (FIG. 10) are operated to set the voltages corresponding to the components $V_{iy}$ (FIG. 2) of the velocity $V_i$ of the energy source 4 (FIG. 1) related to the rectangular axis Y for the segments 6 (FIG. 2) of the path 3. The signals $U_2$ (FIG. 4) representative of the correction value $\Delta V_i$ (FIG. 22) of the velocity $V_i$ are delivered from the memory unit 23 (FIG. 10) to the inputs of the dividers $163_1, \ldots, 163_i, \ldots, 163_m$ and $164_1, \ldots, 164_i, \ldots, 164_m$ of the signal dividing unit 35. The division factors of the dividers $161_{1-m}$, $162_{1-m}$, $163_{1-m}$, and $164_{1-m}$ are set in proportion to the signals representative of the components $V_{ix}$, $V_{iy}$ (FIG. 2) of the velocity $V_i$, related to respective axes X,Y. The signals provided by the dividers $161_1, \ldots, 161_i, \ldots, 161_m$ (FIG. 10) are switched over by the transistor switches $167_1, \ldots, 167_i, \ldots, 167_m$ and are applied to the input of the integrator in the circuit of the resistor 169. The signals provided by the dividers $163_1, \ldots, 163_i, \ldots, 163_m$ are switched over by the transistor switches $168_1, \ldots, 168_i, \ldots, 168_m$ and pass to the circuit of the resistor 170. The signals from the outputs of the dividers $162_1, \ldots, 162_i, \ldots, 162_m$ and $164_1, \ldots, 164_i, \ldots, 164_m$ are applied to corresponding data inputs of the multichannel switches 39,34. The signal synchronization unit 52 is operated to control the multichannel switches 32,34,37,39. With the switch 186 in the operating position, the output of the AND gate 185 provides a reset signal for the D-flip-flops $176_1, \ldots, 176_i, \ldots, 176_m$ of the shift register. In this case, the D-flip-flop $176_1$ assumes the 1 state, while the D-flip-flops $176_2, \ldots, 176_i, \ldots, 176_m$ assume the 0 state. The signal from the complement output of the D-flip-flop $176_1$ provides for making the transistor switches $167_1$, $168_1$, with the result that the signal representative of the component $V_{ix}$ (FIG. 1) of the velocity $V_i$ and the signal $U_2$ (FIG. 4) representative of the correction $\Delta V_i$ (FIG. 3) of the component $V_{ix}$ for the first segment 6 (FIG. 2) of the path 3 are passed to the input circuits of the operational amplifier 172 (FIG. 10). The rate with which the voltage across the output of operational amplifier 172 is changed, is proportional to the sum of the signals delivered to the circuits of the resistors 169,170 and corresponds to the desired velocity at that segment. The output signal of the operational amplifier 172 is applied to the input of the control unit 28 adapted to control the movement of the energy source 4 (FIG. 1) relative to the axis X, and is also applied to the non-inverting input of the operational amplifiers $174_1, \ldots, 174_i, \ldots, 174_m$ (FIG. 10) of the threshold network 48. When the output signals of the operational amplifier 172 reaches one of the voltage levels provided by the dividers $175_1, \ldots, 175_i, \ldots, 175_m$ in accordace with a condition where the path 3 (FIG. 2) is divided into the straight line segments 6, the polarity of the signal at the output of a respective threshold network, 48 or 49, (FIG. 6) is reversed. In this case, the output of a respective AND gate 180 (FIG. 10) provides a pulse of negative polarity. The AND gate 181 intended for logic 0's performs the OR function, which means that its output provides a pulse signal. The latter is applied to the C inputs of D-flip-flops $176_1, \ldots, 176_i, \ldots, 176_m$ and causes the shift register to change to the other state with the result that the logic 1 is shifted one position to the right. The control signals of the multichannel switches 32,34,37,39 are switched over with the result that the signal representative of the component $V_{2ix}$ (FIG. 2) of the velocity $V_{2i}$ at the next segment 6 of the path 3 and the signal $U_2$ (FIG. 4) representative of the correction value $\Delta V_{2i}$ (FIG. 2) of the component $V_{2ix}$. The piecewise linear function signal representative of the components 7,8 determined by the law of movement of the energy source 4 (FIG. 1) and related to the rectangular axes Y,X is therefore formed.

The method and apparatus of the invention provide for the control of the velocity and power of a localized energy source 4 moved along an arbitrary path 3 on the heating surface 1 of the object. A conventional temperature sensor 9 (FIG. 5) provides the signals according to which the velocity $V_i$ and power of the energy source 4 are controlled, while the velocity $V_i$ (FIG. 2) of the energy source 4 (FIG. 1) is controlled with the help of conventional rectangularly oriented units 28,29 (FIG. 5).

The heating surface 1 (FIG. 1) of the object is divided into elementary areas $2_1, \ldots, 2_i, \ldots, 2_n$ (FIG. 4). Conventional means are used to produce, for the elementary areas, the error signals $Q_i$ (FIG. 4) representative of the difference between the predetermined and the measured temperature and the control signals for controlling the velocity and power of the energy source, the velocity control signals being converted to the signals $U_y$, $U_x$ representative of the components Y,X (FIG. 2) determined by the law of movement of the energy source 4 (FIG. 1), related to the rectangular axes X,Y and providing for a variation of the velocity $V_i$ of the energy source 4 (FIG. 1) moved along the predetermined path 3.

The method and apparatus of the invention possess universality and invariance, which means that an arbitrary velocity of the energy source 4 along an arbitrary path 3 can be attained so that they do not interfere with each other.

What is claimed is:

1. A method for controlling heating of an object by a movable energy source having a controllable speed and a controllable power, comprising:
   dividing the surface of the object into a plurality of elemental areas;
   measuring the temperature of each of said elemental areas in a first pattern;
   separately storing temperature signals related to the temperatures of said elemental areas;
   moving said energy source over the surface of said object in a second pattern different from said first pattern;
   controlling the velocity of said energy source as it passes over each particular elemental area in accordance with the respective stored temperature signal of said particular elemental area; and controlling said power of said energy source in accordance with at least one of the stored temperature signals.

2. A method according to claim 1, wherein the step of measuring the temperature further comprises forming a difference between a measured temperature of each of said elemental areas from a predetermined temperature, said difference being said temperature signals.

3. A method according to claim 2, wherein the step of controlling the speed includes converting the stored difference signal for said particular elemental area into a velocity correction signal, converting said velocity correction signal into first and second orthogonal component velocity correction signals, and varying said velocity in accordance with said first and second orthogonal velocity correction signals.

4. A method according to claim 2, wherein the step of controlling the power includes varying said power in accordance with said difference of at least one of said elemental areas.

5. A method according to claim 4, wherein the step of controlling the power includes varying said power in accordance with said temperature difference of all of said elemental areas.

6. A method according to claim 2, wherein the step of moving includes:

approximating said second pattern by a plurality of straight-line segments;

calculating first and second projections of said straight line segments on first and second orthogonal axes;

calculating a velocity correction signal for a particular elemental area related to said difference;

calculating third and fourth projections of said velocity correction signal on said first and second orthogonal axes; and the step of controlling the velocity includes:

moving said energy source on a first orthogonal axes by a first signal related to said first and third projections and on a second orthogonal axis by a second signal related to said second and fourth projections.

7. A method according to claim 2, wherein the step of moving includes:

approximating said second pattern by a plurality of arcs of circles;

determining a curvature for each of said arcs;

producing a predetermined velocity signal for portions of each of said arcs passing over each of said elemental areas;

adding a signal related to said difference for each particular elemental area to said predetermined velocity signal for that particular elemental area to produce a corrected velocity signal for that particular area; and the step of controlling the velocity includes employing said corrected velocity signal for that particular elemental area.

8. A method according to claim 7, wherein the step of controlling includes integrating said corrected velocity signal to obtain a resultant signal, calculating sine and cosine values of said resultant signal, integrating said sine and cosine values, and using the integrated sine and cosine values to control said velocity with respect to orthogonal axes.

9. Apparatus for heating an object comprising:

a movable energy source having a controllable speed and a controllable power;

means for defining a plurality of elemental areas on a surface of said object;

means for measuring the temperature of each of said elemental areas in a first pattern;

means for separately storing temperature signal related to the temperatures of said elemental areas;

means for moving said energy source over said surface of said object in a second pattern different from said first pattern;

means for controlling the velocity of said energy source as it passes over each particular elemental area in accordance with the respective stored temperature signal of said particular elemental area; and means for controlling said power of said energy source in accordance with at least one of the stored temperature signals.

10. Apparatus according to claim 9, further comprising:

means for setting a predetermined temperature of said elemental areas of said object; and means for obtaining a difference between said predetermined temperature and a measured temperature of each of said elemental area, said difference being said temperature signals.

11. Apparatus according to claim 10, further comprising:

means for setting a predetermined power of said energy source; and said means for controlling said power being responsive both to said means for setting a predetermined power and to at least one of said differences.

* * * * *